(12) United States Patent
Meyers et al.

(10) Patent No.: US 8,270,078 B2
(45) Date of Patent: *Sep. 18, 2012

(54) SINGLE LASER ILLUMINATING AND POINTING SYSTEMS

(75) Inventors: Bran E Meyers, Issaquah, WA (US); David C Shannon, Sammamish, WA (US); Miles F Elledge, Kirkland, WA (US)

(73) Assignee: B.E. Meyers, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/099,103

(22) Filed: May 2, 2011

(65) Prior Publication Data
US 2011/0205607 A1    Aug. 25, 2011

Related U.S. Application Data

(63) Continuation of application No. 12/033,794, filed on Feb. 19, 2008, now Pat. No. 7,936,511.

(51) Int. Cl.
*G02B 5/18* (2006.01)

(52) U.S. Cl. .................. 359/558; 359/599; 359/615

(58) Field of Classification Search .................. 356/7, 8; 359/15, 28, 558, 599, 615
See application file for complete search history.

(56) References Cited

U.S. PATENT DOCUMENTS

| | | | |
|---|---|---|---|
| 3,781,121 A | 12/1973 | Gross | |
| 5,056,097 A | 10/1991 | Meyers | |
| 5,309,244 A * | 5/1994 | Katagiri et al. | 358/296 |
| 5,483,362 A | 1/1996 | Tai et al. | |
| 5,638,220 A | 6/1997 | Ohtomo et al. | |
| 6,421,180 B1 * | 7/2002 | Montgomery et al. | 359/618 |
| 6,490,060 B1 | 12/2002 | Tai et al. | |
| 6,714,564 B1 | 3/2004 | Meyers | |
| 7,145,703 B2 | 12/2006 | Sieczka et al. | |
| 7,584,569 B2 | 9/2009 | Kallio | |

* cited by examiner

*Primary Examiner* — Frank Font
(74) *Attorney, Agent, or Firm* — McKenna Long & Aldridge LLP

(57) ABSTRACT

Dual-function laser systems and methods are disclosed. In one implementation, an apparatus includes a laser source configured to emit a beam; a collimating optical system spaced apart from the laser source; and a diffractive element positioned to diffract the beam to provide a diffracted beam to the collimating optical system such that the collimating optical system refracts the diffracted beam to form an approximately collimated central portion and a diverging outer portion.

20 Claims, 3 Drawing Sheets

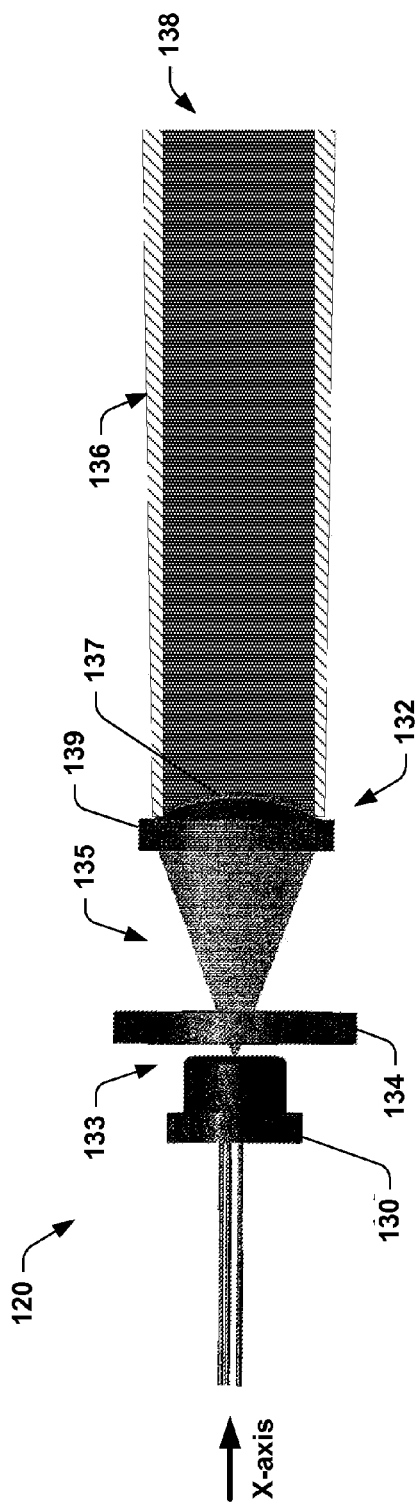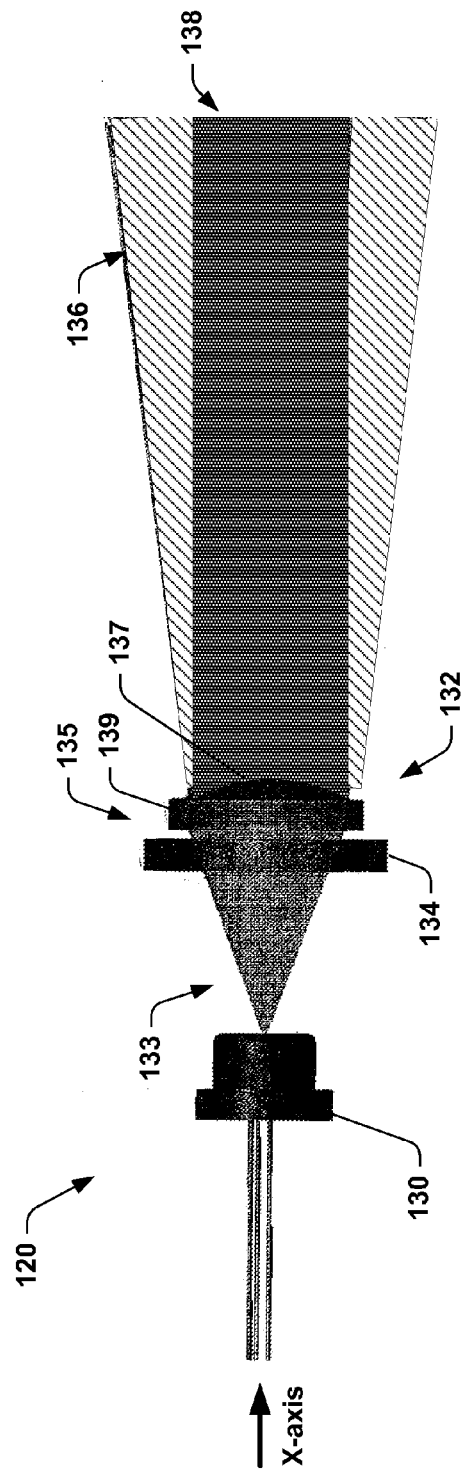
FIG. 3
FIG. 4

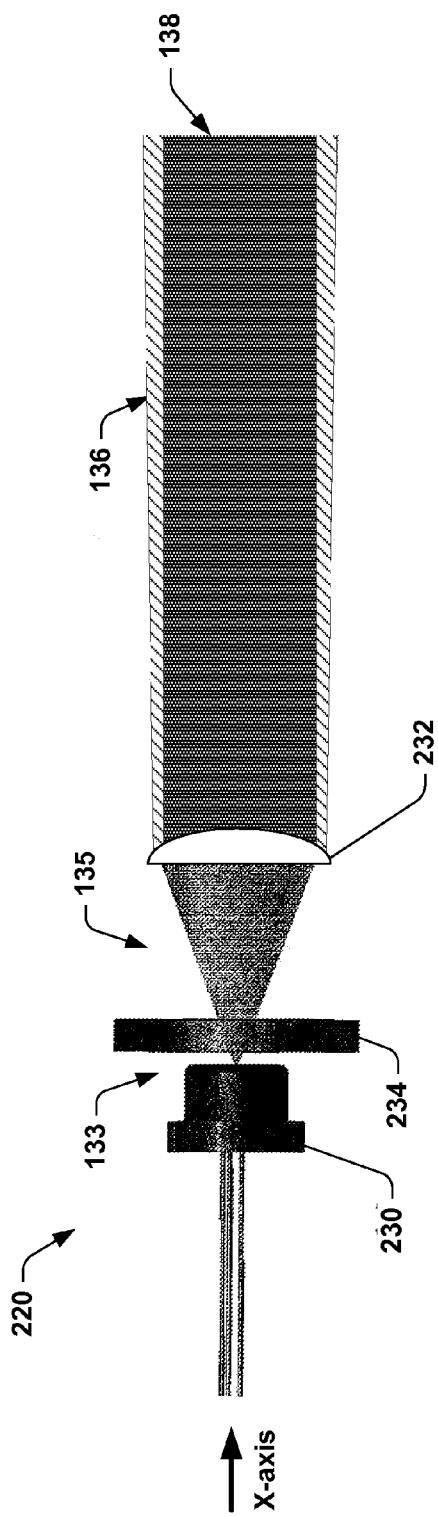
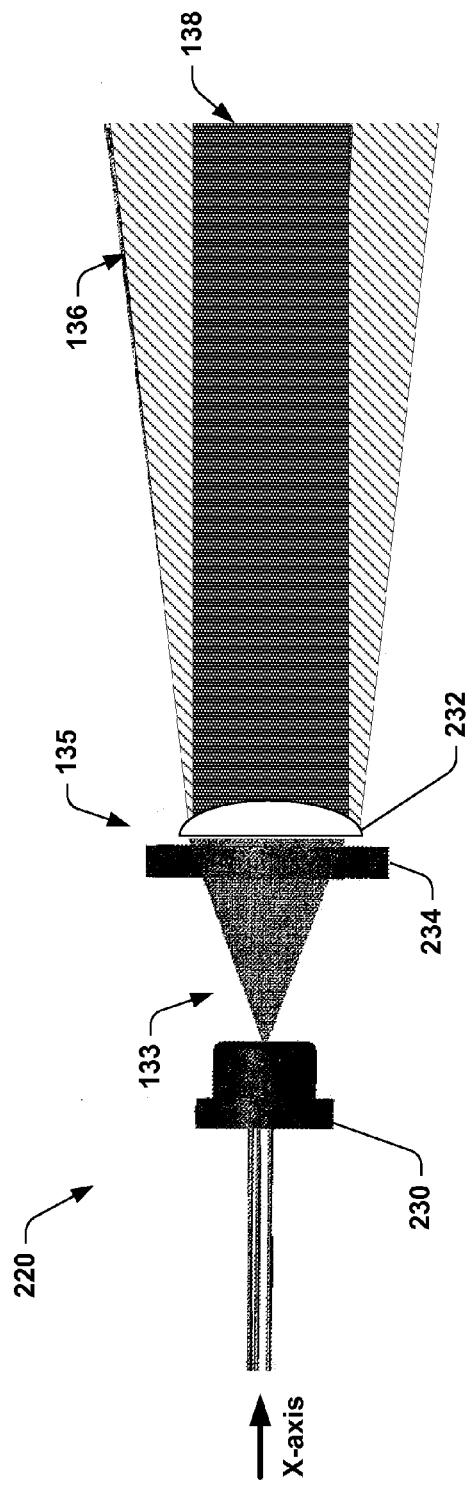

__US 8,270,078 B2__

SINGLE LASER ILLUMINATING AND POINTING SYSTEMS

CROSS-REFERENCE TO RELATED APPLICATIONS

This patent application is a continuation of U.S. patent application Ser. No. 12/033,794 filed Feb. 19, 2008, which application is incorporated herein by reference.

FIELD OF THE INVENTION

The present disclosure is directed to laser devices, and more particularly, to laser systems and methods that provide a targeting or pointing spot and also an illuminating flood from a single laser source.

BACKGROUND OF THE INVENTION

In general, high-powered laser pointers provide a concentrated beam of light (or pointing dot) which can be used for targeting. When a laser pointer is used at night over long ranges, the user may only see the pointing dot and not the area surrounding the dot. Some laser systems, however, are dual functioning and provide both an illumination flood and a pointing dot. These dual-functioning laser systems are typically used at night to illuminate the area around the targeting spot. By illuminating the surrounding area, the laser provides a user with a wider field of view while continuing to operate as a targeting device.

In the past, one way to produce a dual-functioning laser pointer was to use two separate laser sources. One laser diode was used to illuminate the surrounding area, while another laser diode was used for creating the targeting dot. Using two laser diodes in one laser pointer requires each diode to have its own electronics and power source. Increasing the power source requires larger batteries, which increases the size and weight of the laser pointer.

A more recent approach to produce a dual-functioning laser device has been with a single laser source where the laser beam is split into two separate beams, as described in U.S. Pat. No. 6,714,564 issued to Meyers. For example, FIG. 1 is a schematic illustration of a dual-functioning laser lens assembly in which a single laser 10 emits a beam 11 that passes through a collimating lens 12. The beam 11 has an outer portion 13 and an inner portion 15. The outer and inner beam portions 13, 15 are sent through first and second optical lenses 14, 16 separated by a specified distance. The outer beam portion 13 passes through the first and second lenses 14, 16 in an un-refracted manner (approximately) to provide a collimated targeting beam 17. On the other hand, the first lens 14 refracts the inner portion 15 along a converging path toward the second lens 16, and the second lens 16 further refracts the inner portion 15 into a diverging illuminating beam 18. Thus, the illuminating beam 18 may be used to illuminate a distant target, while the targeting beam 17 may be used for precision aiming at the target. Adjusting the location of the second lens 16 to vary the distance between the first and second lenses 14, 16 alters the size and thus intensity of the illuminating beam 18.

Although desirable results have been achieved using such previous dual-functioning laser devices, there is room for improvement. Single laser devices that provide the desired targeting and illuminating capabilities and that are easier and less expensive to manufacture, and which provide improved laser power output characteristics, would have considerable utility.

SUMMARY

Dual-function laser systems and methods are disclosed. Embodiments of systems and methods in accordance with the teachings of the present disclosure may advantageously provide the desired dual functionality using systems that are more easily and inexpensively manufactured, and that are more operationally robust, than comparable prior art systems.

In one implementation, an apparatus includes a laser source configured to emit a beam; a collimating optical system spaced apart from the laser source; and a diffractive element positioned to diffract the beam to provide a diffracted beam to the collimating optical system such that the collimating optical system refracts the diffracted beam to form an approximately collimated central portion and a diverging outer portion.

In another implementation, a method includes providing a laser beam; diffracting at least a portion of the laser beam to form a diffracted beam; and refracting at least a portion of the diffracted beam to form a collimated beam portion and a diverging beam portion.

In a further implementation, a system includes a primary system configured to perform operations with respect to a distant target; and a dual-function laser assembly, including: a laser source configured to emit a beam; a collimating optical system spaced apart from the laser source; and a diffractive element positioned to diffract the beam to provide a diffracted beam to the collimating optical system such that the collimating optical system refracts the diffracted beam to form an approximately collimated central portion configured to be directed onto the distant target, and a diverging outer portion configured to be directed into an illuminated region about the distant target.

BRIEF DESCRIPTION OF THE DRAWINGS

Embodiments of the present disclosure are described in detail below with reference to the following drawings.

FIGS. 3 and 4 show a laser assembly according to an embodiment of the invention in first and second operating positions, respectively.

FIGS. 5 and 6 show a laser assembly according to another embodiment of the invention in first and second operating positions, respectively.

DETAILED DESCRIPTION

The present disclosure is directed to systems and methods that provide a targeting or pointing spot and also an illuminating flood from a single laser source. Many specific details of certain embodiments in accordance with the present disclosure are set forth in the following description and in FIGS. 2-6 to provide a thorough understanding of such embodiments. One skilled in the art, however, will understand that the present invention may have additional embodiments, or that the invention may be practiced without several of the details described in the following description.

Figure 2:
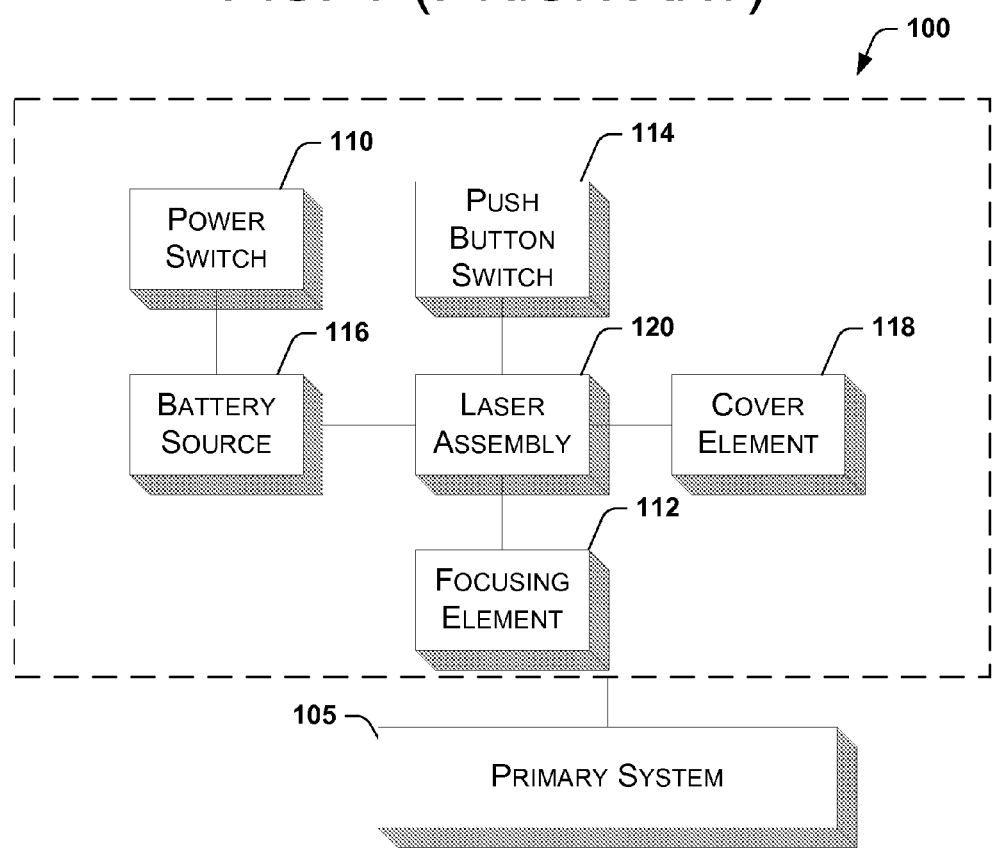
FIG. 2 is a block diagram of a laser pointer that may be used in accordance with one embodiment of the invention.

FIG. 2 is a block diagram of a laser device 100 that may be used in accordance with one embodiment of the invention. As shown in FIG. 2, the laser device 100 may be coupled to a primary system 105 and may serve as a dual-function targeting and illuminating system for the primary system 105. The primary system 105 may be any of a variety of different systems, including weapon systems, camera or surveillance systems, or other suitable types of systems.

In this implementation, the single laser device 100 includes a battery source 116 that provides power for operating the device 100. A laser assembly 120 and focusing element 112 are provided within the laser device 100. The focusing element 112 may provide adjustment for beam alignment. A power switch 110 is provided for turning the laser device 100 on and off. The power switch 110 may be configured to directly activate a laser source. Conversely, the laser device 100 may also include a push button switch 114, where the push button switch 114 is configured to activate the laser source once the power switch 110 has been activated. A cover element 118 may be included to provide a protective covering for an optical element within the laser assembly 120.

FIGS. 3 and 4 illustrate the laser assembly 120, which may be the laser assembly of the device 100 shown in FIG. 2. The laser assembly 120 contains a single laser source 130, an optical element 132 located at a fixed position relative to the laser source 130, and a moveable diffractive element (or diffuser) 134 disposed between the laser source 130 and the optical element 132.

The laser source 130 emits a laser beam 133 toward the diffractive element 134. In some embodiments, the laser beam 133 may be an approximately monochromatic beam 133. The laser source 130 may act as a point source and emit a diverging beam 133, however, in alternate embodiments, the laser beam 133 may be non-diverging, such as an approximately collimated beam or a converging beam. The laser source 130 may be a laser diode, however, other laser sources may be used. In one embodiment, the beam's wavelength is within the visible spectrum of light, such as with a green or red laser. In another embodiment, the laser source 130 produces a wavelength within other portions of the spectrum, such as infrared or ultraviolet radiation. In those embodiments that operate within a non-visible portion of the electromagnetic spectrum, it may be possible to view the laser beam 122 using suitable goggles or imaging devices (e.g. infrared or night vision imaging devices).

In operation, the laser beam 133 from the laser source 130 passes through the diffractive element 134 to provide a diffracted beam 135 to the optical element 132. Similarly, the optical element 132 is aligned along the path of the diffracted beam 135 so that the diffracted beam 135 is projected through the optical element 132. From the diffracted beam 135, the optical element 132 forms an outer portion 136 and an approximately collimated central portion 138. The outer portion 136 diverges as it propagates toward a distant target (not shown), forming an illuminated region around the central portion 138. The central portion 138 remains approximately collimated as it propagates toward the distant target to form a targeting spot.

Figure 1:
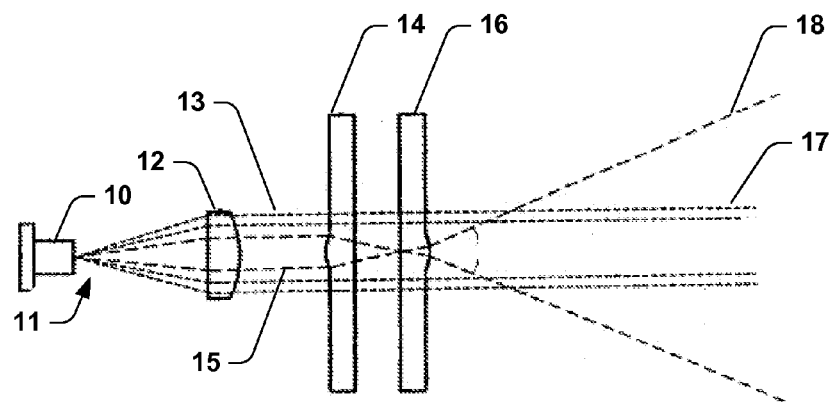
FIG. 1 is a schematic illustration of a dual functioning laser lens assembly that splits a single beam in accordance with the prior art.

More specifically, in the embodiment shown in FIGS. 3 and 4, the optical element 132 includes a central, convex portion 137, and an outer planar portion 139. The portion of the diffracted beam 135 that passes through the convex portion 137 forms the central portion 138, and ultimately the targeting spot at the distant target. The portion of the diffracted beam 135 that passes through the planar portion 139 forms the outer portion 136, which ultimately becomes the illuminated region at the distant target. The optical element 132 may be configured to provide the desired functionality using techniques generally known to persons of ordinary skill in the art, as generally discussed, for example, in U.S. Pat. No. 6,714,564 issued to Meyers, incorporated herein by reference As noted above, the diffractive element 134 is configured so that it may be moved along the x-axis (see FIG. 3) between the laser source 130 and the optical element 132 to alter the size of the outer illuminating portion 136. In some embodiments, the focusing element 112 of FIG. 1 provides a user with the ability to move the diffractive element 134. In a first position shown in FIG. 3, the diffractive element 134 may be disposed proximate the laser source 130 so that the illuminating portion 136 is relatively narrow and the illuminated region around the central portion 138 remains relatively small. Alternately, in a second position shown in FIG. 4, the diffractive element 134 may be disposed proximate the optical element 132 so that the outer illuminating portion 136 is more divergent, creating a relatively larger illuminated region around the central portion 138 for greater visibility around the distal target. The diffractive element 134 may be continuously moveable between the laser source 130 and the optical element 132, or alternately, the diffractive element 134 may move in increments or "steps."

As noted above, the diffractive element 134 is configured to diffract at least part of the laser beam 133 to provide the diffused beam 135. For example, in some embodiments, the diffractive element 134 acts as a diffraction grating that transmits the light in discrete directions. These discrete directions may be called diffraction orders. The undiffracted (or zero order) light produces the central portion 138 which ultimately forms a targeting spot on the distant target. The diffracted (or higher order) light produces the outer portion 136 which becomes an illuminated region around distant target. The location of the diffractive element 134 relative to the laser source 130 determines the size of the output portion 136, and thus, the illuminated region.

The laser assembly 120 provides variable size of the illuminated region at the distant target by varying the size of the outer portion 136. More specifically, by moving the diffractive element 134 relative to the laser source 130, the user is able to alter the amount of light passing through the planar portion 139 of the optical element 132, and thus the size of the outer portion 136.

When the diffractive element 134 is close to the laser source 130, the light entering the element 134 resembles a point source. When light enters the diffractive element 134 as a point source, the element 134 scatters the light at the same angle the light was originally traveling. As the diffractive element 134 is moved away from the laser source 130, the source size of the light entering the diffractive element 134 is much larger and enters the element across a greater surface area. As the source size of the laser enlarges, the diffractive element 134 scatters the light at multiple angles.

The intensities of the central portion (for pointing and targeting) 138 and the outer portion (for illumination) 136 are variable. The diffractive element 134 may be configured to determine the fraction of light provided to the zero order and the fraction of light provided to the higher orders. Although the total energy provided to the central portion 138 and the outer portion 136 may remain reasonably constant (e.g. neglecting light absorption), the amount of energy provided to each one is variable. Generally, as the energy going into the central portion 138 increases, the energy going into the outer portion 136 decreases. Therefore, a user can adjust the relative percentages of energy to be allotted to the central portion 138 and to the outer portion 136, as visually demonstrated by comparing FIGS. 3 and 4.

In some embodiments, the diffractive element 134 is a standard diffuser. The process for making the diffuser is based on standard technology and will not be discussed here in the interest of brevity. The diffuser selected, however, may depend on the relative amounts of energy the user wanted in the central portion (for targeting and pointing) 138 and in the outer portion (for illumination) 136.

In other embodiments, the diffractive element 134 may be a holographic optical element or diffuser. The beam emitted through the holographic diffuser defines the pattern or shape of the outer portion 136 and thus the illuminated region at the target. For example, the hologram may have the pattern of a square, and when the beam is projected through the hologram, the cross-sectional shape of the outer portion 136 is in the shape of the square. Many different hologram patterns may be used. In one embodiment the holographic diffuser is capable of generating multiple patterns. Suitable holographic diffusers that may be used as diffractive elements include a variety of commercially-available devices (e.g. from Luminit Company of Torrance Calif.), or devices that may be constructed using techniques available in the public literature.

It will be appreciated that a variety of alternate embodiments in accordance with the teachings of the present disclosure may be conceived, and that the present disclosure is not limited to the particular embodiments described herein and shown in the accompanying figures. For example, although the components of the laser system 120 (e.g. laser source 130, diffractive element 134, and optical element 132) have been shown and described as being linearly aligned along an x axis, it should be appreciated that in alternate embodiments, these components need not be linearly aligned. Using various beam-splitting components, mirrors, or refractive components, such non-linear alternate embodiments may be conceived to provide the desired functionality. Similarly, it should be appreciated that the system diagram shown in FIG. 2 is merely representative of one exemplary system in which the teachings of the present disclosure may be employed, and that a multitude of alternate system embodiments may be conceived that incorporate the teachings of the present disclosure.

For example, another embodiment of a laser assembly 220 in accordance with the teachings of the present disclosure is shown in FIGS. 5 and 6. In this embodiment, the laser assembly 220 includes a laser source 230, a collimating optical system 232, and a diffractive element (or diffuser) 234 disposed between the laser source 230 and the collimating optical system 232. The collimating optical system 232 may be a plano-convex lens, a concave-convex lens, or any other suitable combination of lenses and/or mirrors. It will be appreciated that, in the embodiment shown in FIGS. 5 and 6, the collimating optical system 232 does not include the planar portion 139 of the previously-described embodiment (shown in FIGS. 3-4).

In operation, the laser source 230 emits a laser beam 133 that passes through the diffractive element 234 to provide a diffracted beam 135 to the collimating optical system 232. In turn, the diffracted beam 135 is projected through the collimating optical system 232 to form an outer portion 136 and an approximately collimated central portion 138. As described above, the outer portion 136 diverges as it propagates toward a distant target (not shown), forming an illuminated region around the central portion 138, while the central portion 138 remains approximately collimated as it propagates toward the distant target to form a targeting spot.

More specifically, in a first position shown in FIG. 5, the diffractive element 234 may be disposed proximate the laser source 230 so that the illuminating portion 136 is relatively narrow and the illuminated region around the central portion 138 remains relatively small (or non-existent). Alternately, in a second position shown in FIG. 6, the diffractive element 234 may be disposed proximate the collimating optical system 232 so that the outer illuminating portion 136 is more divergent, creating a relatively larger illuminated region around the central portion 138 for greater visibility around the distal target. It will be appreciated that no outer planar portion (designated as 139 in FIGS. 3 and 4) is necessary to form the illuminating portion 136. Again, the diffractive element 234 may be moveable between the laser source 230 and the collimating optical system 232 (continuously or incrementally). Thus, the desired dual functionality of providing illuminating and targeting light may be accomplished using systems having only a convex lens.

Embodiments of dual-functioning laser systems and methods in accordance with the teachings of the present disclosure may provide significant advantages. For example, a laser assembly 120 having a diffractive element 134 and an optical element 132 can be easily manufactured because the diffractive element 134 generally is less sensitive (or not sensitive) to tilt. Therefore, the diffractive element 134 can handle large manufacturing tolerances and making the element inexpensive and faster to manufacture. In addition, because the diffractive element 134 is not sensitive to tilt, the laser system may be more robust than previous laser devices.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the present disclosure. Accordingly, the scope of the invention should be determined from the following claims.

What is claimed is:

1. An apparatus, comprising:
  a laser source configured to emit a beam;
  a collimating optical system spaced apart from the laser source; and
  a diffractive element positioned to diffract the beam to provide a diffracted beam to the collimating optical system such that the collimating optical system refracts the diffracted beam to form an approximately collimated central portion and a diverging outer portion.

2. The apparatus of claim 1 wherein the diffractive element scatters at least some of the beam to a zero order and at least one higher order, the zero order producing the central portion and the at least one higher order producing the outer portion.

3. The apparatus of claim 2 wherein the beam is scattered to multiple higher orders.

4. The apparatus of claim 1 wherein the laser source comprises a laser diode.

5. The apparatus of claim 1 wherein the diffractive element is moveable to adjust relative percentages of the diffracted beam that form the central and outer portions.

6. The apparatus of claim 1 wherein the laser source emits the beam along a beam axis, and wherein the laser source, the diffractive element, and the collimating optical system are approximately linearly aligned along the beam axis.

7. The apparatus of claim 6 wherein the diffractive element is controllably moveable along the beam axis to adjust relative percentages of the diffracted beam that form the central and outer portions.

8. The apparatus of claim 1 wherein the diffractive element comprises a diffuser.

9. The apparatus of claim 8 wherein diffuser comprises a holographic diffuser.

10. The apparatus of claim 1 wherein the collimating optical system comprises a plano-convex lens.

11. A method, comprising:
providing a laser beam;
diffracting at least a portion of the laser beam to form a diffracted beam; and refracting at least a portion of the diffracted beam using a collimating optical system to form a collimated beam portion and a diverging beam portion.

12. The method of claim 11, further comprising:
projecting the collimated beam portion onto a target; and
projecting the diverging beam portion into an illuminating region about the target.

13. The method of claim 11 wherein diffracting at least a portion of the laser beam comprises diffusing at least a portion of the laser beam into a plurality diffractive orders, the plurality of diffractive orders including a zero order and at least one higher order, the zero order at least partially forming the collimated beam portion and the at least one higher order at least partially forming the diverging beam portion.

14. The method of claim 11 wherein providing a laser beam comprises providing a laser beam from a point source.

15. The method of claim 11, further comprising adjusting relative percentages of the diffracted beam that form the collimated beam portion and the diverging beam portion.

16. The method of claim 15 wherein adjusting relative percentages includes adjusting a position of a diffracting element.

17. A system, comprising:
a primary system configured to perform operations with respect to a distant target; and
a dual-function laser assembly, including:
a laser source configured to emit a beam;
a collimating optical system spaced apart from the laser source; and
a diffractive element positioned to diffract the beam to provide a diffracted beam to the collimating optical system such that the collimating optical system refracts the diffracted beam to form an approximately collimated central portion configured to be directed onto the distant target, and a diverging outer portion configured to be directed into an illuminated region about the distant target.

18. The system of claim 17 wherein the diffractive element is moveable to adjust relative percentages of the diffracted beam that form the central and outer portions.

19. The system of claim 17 wherein the laser source emits the beam along a beam axis, and wherein the laser source, the diffractive element, and the collimating optical system are approximately linearly aligned along the beam axis.

20. The system of claim 17 wherein the primary system includes at least one of a weapon system, a camera system, and a surveillance system.

\* \* \* \* \*